United States Patent
Kawakami et al.

(10) Patent No.: US 10,645,274 B2
(45) Date of Patent: May 5, 2020

(54) SERVER APPARATUS, DISTRIBUTION SYSTEM, DISTRIBUTION METHOD, AND PROGRAM WITH A DISTRIBUTOR OF LIVE CONTENT AND A VIEWER TERMINAL FOR THE LIVE CONTENT INCLUDING A PHOTOGRAPHED IMAGE OF A VIEWER TAKING A DESIGNATED BODY POSE

(71) Applicant: DWANGO Co., Ltd., Tokyo (JP)

(72) Inventors: Nobuo Kawakami, Tokyo (JP); Hiroaki Saito, Tokyo (JP); Takashi Kojima, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 16/140,872

(22) Filed: Sep. 25, 2018

(65) Prior Publication Data
US 2019/0104249 A1 Apr. 4, 2019

(30) Foreign Application Priority Data
Sep. 29, 2017 (JP) ................................. 2017-190511

(51) Int. Cl.
H04N 5/232 (2006.01)
G06F 3/16 (2006.01)
H04L 29/08 (2006.01)

(52) U.S. Cl.
CPC ......... *H04N 5/23222* (2013.01); *G06F 3/167* (2013.01); *H04L 67/10* (2013.01);
(Continued)

(58) Field of Classification Search
CPC ............... H04N 5/232; H04N 5/23218; H04N 5/23229; H04N 5/23222; H04N 5/23219;
(Continued)

(56) References Cited

U.S. PATENT DOCUMENTS 7,855,737 B2 * 12/2010 Petrescu ............ H04N 5/23219 348/239
8,417,109 B2 * 4/2013 Takatsuka .............. G03B 15/00 396/263

(Continued)

FOREIGN PATENT DOCUMENTS

CN 104735357 A 6/2015
CN 104883503 A 9/2015
(Continued)

OTHER PUBLICATIONS

Decision to Grant of corresponding Japanese application No. JP2017-190511; 6 pgs.
(Continued)

*Primary Examiner* — Twyler L Haskins
*Assistant Examiner* — Akshay Trehan
(74) *Attorney, Agent, or Firm* — Maier & Maier, PLLC

(57) ABSTRACT

A server apparatus performs communication with a distributor terminal that is used by a distributor of live content, and a viewer terminal that is used by a viewer of the live content. The server apparatus includes a photographing condition acquisition unit, a photographing instruction signal transmission unit, and a photographed image acquisition unit. The photographing condition acquisition unit acquires a photographing condition set by the distributor from the distributor terminal. The photographing instruction signal transmission unit transmits a photographing instruction signal, which allows a photographing operation to be executed in a case where the viewer satisfies the photographing condition, to the viewer terminal. The photographed image acquisition unit acquires a photographed image obtained by the photographing operation from the viewer terminal.

19 Claims, 13 Drawing Sheets

(52) U.S. Cl.
CPC ..... *H04N 5/23203* (2013.01); *H04N 5/23206* (2013.01); *H04N 5/23216* (2013.01); *H04N 5/23219* (2013.01); *H04N 5/232945* (2018.08); *H04N 5/232061* (2018.08)

(58) Field of Classification Search
CPC ........ H04N 21/00; H04N 21/20; H04N 21/27; H04N 21/274; H04N 21/2743; H04N 21/40; H04N 21/60; H04N 21/80; H04N 21/85; H04N 5/23206; H04N 5/232061; G06F 3/167; H04L 67/10
See application file for complete search history.

(56) References Cited

U.S. PATENT DOCUMENTS

| | | | | |
|---|---|---|---|---|
| 8,749,687 B2* | 6/2014 | Kang | ............... | H04N 5/232 348/333.01 |
| 9,479,693 B2* | 10/2016 | Kang | ............... | H04N 5/23222 |
| 9,656,144 B2* | 5/2017 | Jafarifesharaki | ....... | H04L 67/42 |
| 2004/0064510 A1 | 4/2004 | Ooi et al. | | |
| 2004/0183915 A1* | 9/2004 | Gotohda | ............... | H04N 5/232 348/207.11 |
| 2005/0036044 A1* | 2/2005 | Funakura | ........... | G06K 9/00228 348/239 |
| 2005/0206751 A1* | 9/2005 | Manico | ............... | G11B 27/034 348/239 |
| 2007/0146798 A1* | 6/2007 | Eto | ............... | H04N 1/00132 358/302 |
| 2007/0263071 A1* | 11/2007 | Lee | ............... | H04N 1/00204 348/14.02 |
| 2012/0120273 A1* | 5/2012 | Amagai | ............ | H04N 5/23203 348/222.1 |
| 2013/0124207 A1* | 5/2013 | Sarin | ............... | G10L 15/22 704/275 |
| 2013/0235245 A1* | 9/2013 | Eaton | ............... | H04N 5/23219 348/333.01 |
| 2014/0136211 A1* | 5/2014 | Chou | ............... | G10L 15/22 704/275 |
| 2015/0009359 A1* | 1/2015 | Zaheer | ............... | H04N 1/6077 348/223.1 |
| 2015/0163457 A1* | 6/2015 | Shimoyama | ....... | H04N 5/23216 348/77 |
| 2016/0093020 A1* | 3/2016 | Basalamah | ............ | H04N 5/225 345/634 |
| 2016/0155009 A1* | 6/2016 | Han | ............... | H04N 5/23222 382/173 |
| 2016/0231818 A1* | 8/2016 | Zhang | ............... | G06F 3/017 |
| 2017/0329496 A1 | 11/2017 | Jeong | | |
| 2018/0070025 A1* | 3/2018 | Nakagawa | ............. | H04N 5/232 |
| 2018/0077344 A1* | 3/2018 | Bostick | ............. | H04N 5/23219 |
| 2019/0037135 A1* | 1/2019 | Hedge | ............... | H04N 5/23229 |

FOREIGN PATENT DOCUMENTS

| | | |
|---|---|---|
| CN | 106030646 A | 10/2016 |
| CN | 106331754 A | 1/2017 |
| CN | 106789991 A | 5/2017 |
| CN | 107071584 A | 8/2017 |
| JP | 2006-58798 A | 3/2006 |
| JP | 2008-210417 A | 9/2008 |
| JP | 2014-027365 A | 2/2014 |
| JP | 2016-72673 A | 5/2016 |

OTHER PUBLICATIONS

Office Action dated Aug. 23, 2019, in corresponding Chinese Application No. 201811138081.6; 17 pages.

* cited by examiner

SERVER APPARATUS, DISTRIBUTION SYSTEM, DISTRIBUTION METHOD, AND PROGRAM WITH A DISTRIBUTOR OF LIVE CONTENT AND A VIEWER TERMINAL FOR THE LIVE CONTENT INCLUDING A PHOTOGRAPHED IMAGE OF A VIEWER TAKING A DESIGNATED BODY POSE

FIELD

The present disclosure relates to a server apparatus, a distribution system, a distribution method, and a program.

BACKGROUND

In recent, a service of distributing live content through a network has been spreading. The live content is also called Internet live broadcasting.

A distributor who distributes the live content may take communication with a viewer during live broadcasting to increase the number of viewers in some cases. For example, it is considered that the distributor collects an image photographed by the viewer, and uses the image in distribution.

However, even when the distributor makes a request for the viewer to perform photographing and to transmit photographed image data, the request is likely to be denied. The reason for this is that an interval for determination is given to the viewer. On the other hand, when the distributor guides the viewer with a motive having entertainment characteristics, the viewer is likely to agree a photographing action. Accordingly, it is preferable to make collection a photographed image from the viewer smooth by introducing a motive having entertainment characteristics.

Patent Literature 1 discloses a photograph print providing apparatus that is used in a game center. The apparatus performs guidance with voice and an animation in correspondence with a photographing course that is selected, and performs repetitive photographing such as 10 shots and 6 shots.

Patent Literature 2 discloses an apparatus that performs auto-photographing with predetermined voice or a pose set as a trigger. In addition, Patent Literature 2 discloses that a control unit performs short-range radio communication based on Bluetooth (registered trademark) with an imaging unit to perform remote auto-photographing.
[Patent Literature 1] JP-A-2006-58798
[Patent Literature 2] JP-A-2016-72673

SUMMARY

The apparatus disclosed in Patent Literature 1 guides a subject through guidance with voice and an animation. However, the guidance is guidance to perform desired photographing, and is not guidance to make the subject easily agree with the photographing action. In the apparatus disclosed in Patent Literature 2, predetermined voice or pose is set as a photographing condition. However, the photographing condition is not guidance to make the subject easily agree with the photographing action.

In addition, in Patent Literature 1, it is assumed that a photographer is in a photographing location. On the other hand, Patent Literature 2 also discloses the remote auto-photographing. However, due to short-range radio communication, it is necessary for the photographer to be near the photographing location (for example, within 20 meters from the photographing location). According to this, the technologies disclosed in Patent Literature 1 and Patent Literature 2 are not applicable to a configuration in which a distributor who is far away from a viewer who becomes a subject collects a photographed image from the viewer as a photographer.

As described above, Patent Literature 1 and Patent Literature 2 do not disclose a configuration of making collection of a photographed image from a viewer by the distributor smooth.

Here, the present disclosure has been made in consideration of such circumstances, and an object thereof is to provide a server apparatus that makes collection of a photographed image from a viewer by a distributor smooth, and the like.

To accomplish the above-described object, according to a first aspect of the disclosure, there is provided a server apparatus that performs communication with a distributor terminal that is used by a distributor of live content, and a viewer terminal that is used by a viewer of the live content. The server apparatus includes: a photographing condition acquisition unit that acquires a photographing condition set by the distributor from the distributor terminal; a photographing instruction signal transmission unit that transmits a photographing instruction signal, which allows a photographing operation to be executed in a case where the viewer satisfies the photographing condition, to the viewer terminal; and a photographed image acquisition unit that acquires a photographed image obtained by the photographing operation from the viewer terminal.

In addition, to accomplish the above-described object, according to a second aspect of the disclosure, there is provided a distribution system including: a distributor terminal that is used by a distributor of live content; a viewer terminal that is used by a viewer of the live content; and a server apparatus that performs communication with the distributor terminal and the viewer terminal. The distributor terminal transmits a photographing condition, which is set by the distributor, to the server apparatus. The server apparatus transmits a photographing instruction signal, which allows a photographing operation to be executed in a case where the viewer satisfies the photographing condition, to the viewer terminal. The viewer terminal transmits a photographed image obtained by the photographing operation to the server apparatus.

In addition, to accomplish the above-described object, according to a third aspect of the disclosure, there is provided a distribution method including: acquiring a photographing condition set by the distributor from the distributor terminal; transmitting a photographing instruction signal, which allows a photographing operation to be executed in a case where the viewer satisfies the photographing condition, to the viewer terminal; and acquiring a photographed image obtained by the photographing operation from the viewer terminal.

In addition, to accomplish the above-described object, according to a fourth aspect of the disclosure, there is provided a program that allows a computer to function as: a photographing condition acquisition unit that acquires a photographing condition set by the distributor from the distributor terminal; a photographing instruction signal transmission unit that transmits a photographing instruction signal, which allows a photographing operation to be executed in a case where the viewer satisfies the photographing condition, to the viewer terminal; and a photographed image acquisition unit that acquires a photographed image obtained by the photographing operation from the viewer terminal.

According to the disclosure, it is possible to make collection of a photographed image from a viewer by a distributor smooth.

DETAILED DESCRIPTION

Hereinafter, embodiments of the disclosure will be described with reference to the accompanying drawings. Furthermore, the following embodiments are not intended to limit the content of the disclosure which is described in the appended claims. In addition, it cannot be said that all of constituent elements illustrated in the embodiments are essential constituent elements of the disclosure.

First Embodiment

Figure 1:
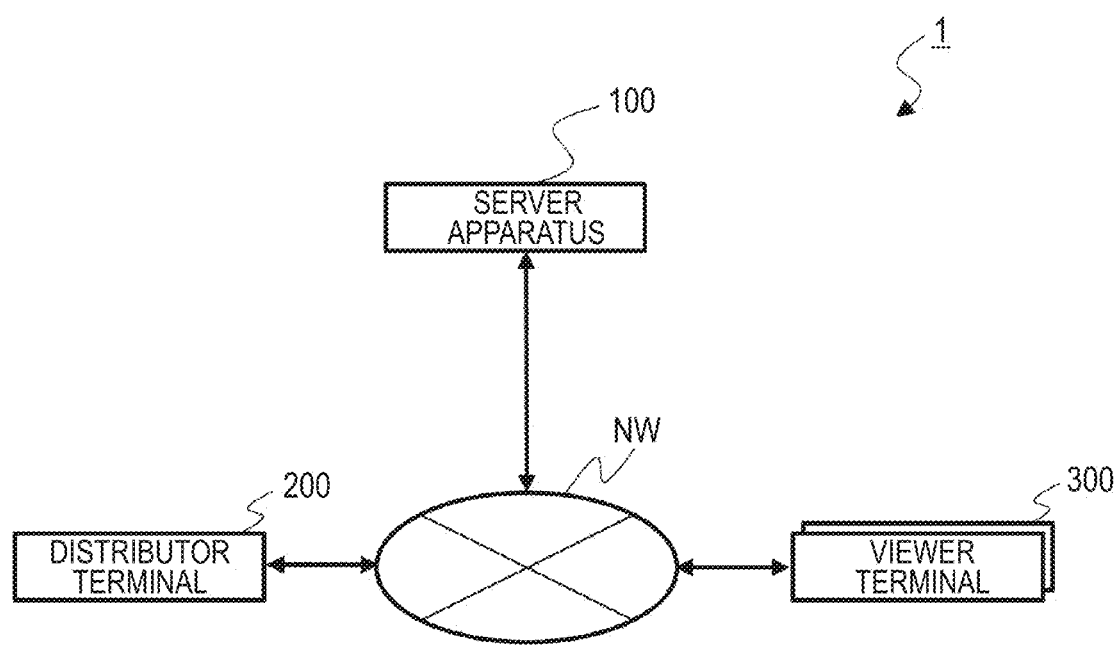
FIG. 1 is a diagram illustrating a configuration example of a distribution system according to a first embodiment.

As illustrated in FIG. 1, a distribution system 1 according to this embodiment includes a server apparatus 100, a distributor terminal 200, and one or more viewer terminals 300. The server apparatus 100, the distributor terminal 200, and the viewer terminals 300 are connected in a communication-possible manner through a network NW. Examples of the network NW include a world area network (WAN).

The server apparatus 100 provides a distribution service through the network NW. The server apparatus 100 distribute live content to the viewer terminals 300 on the basis of received data from the distributor terminal 200.

The distributor terminal 200 is a device such as a pc, a tablet terminal, or a smart phone which has a communication function. The distributor terminal 200 is used by a distributor to distribute live content.

The viewer terminals 300 are devices such as a pc, a tablet terminal, and a smart phone which have a communication function. The viewer terminals 300 are used by a viewer who views live content.

<Configuration of Server Apparatus>

Figure 2:
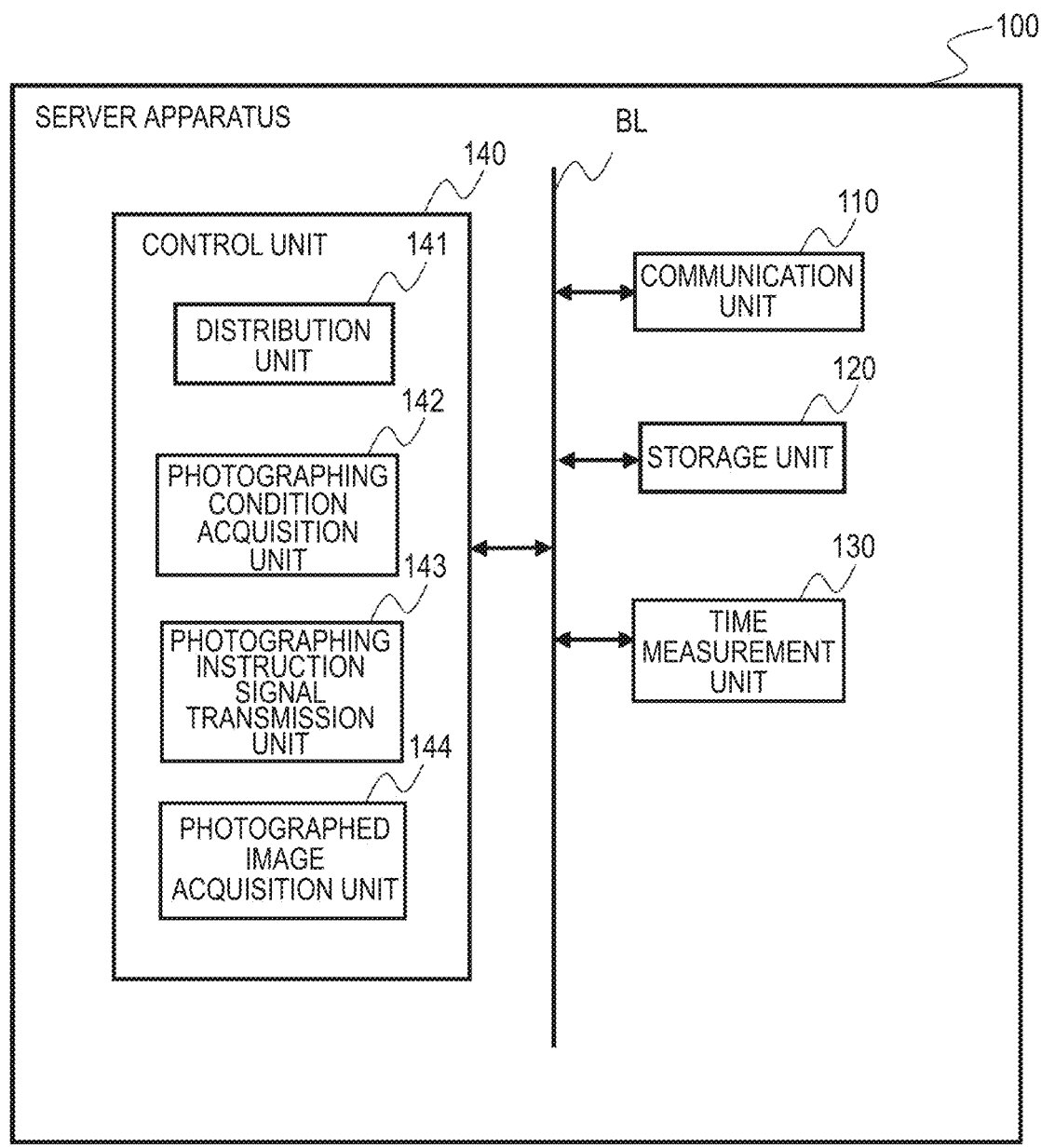
FIG. 2 is a block diagram illustrating a configuration example of a server apparatus according to the first embodiment.

Hereinafter, a configuration of the server apparatus 100 will be described in detail. As illustrated in FIG. 2, the server apparatus 100 includes a communication unit 110 that performs communication with another apparatus, a storage unit 120 that stores various pieces of data, a time measurement unit 130 that counts time, and a control unit 140 that performs control of the entirety of an apparatus. The constituent elements are connected to each other through a bus line BL.

The communication unit 110 is a communication interface that includes a network interface card controller (NIC) configured to perform wired communication or radio communication. The communication unit 110 performs communication with the distributor terminal 200 and the viewer terminals 300 through the network NW.

The storage unit 120 includes a random access memory (RAM), a read only memory (ROM), or the like. The storage unit 120 stores a program for executing various kinds of control processing, various pieces of data, and the like.

The time measurement unit 130 includes an oscillation circuit and a variable phase locked loop (PLL) which are configured to generate a clock signal, a counter circuit that counts the number of pulses of the clock signal, and the like. The time measurement unit 130 counts time on the basis of the counted number of pulses.

The control unit 140 includes a central processing unit (CPU) and the like. The control unit 140 controls entire operations of the server apparatus 100 by executing a program that is stored in the storage unit 120. The control unit 140 performs various kinds of control at a timing based on the number of pulses which is counted by the time measurement unit 130. In addition, the control unit 140 counts a time elapsed from an initiation time of content or makes a determination as to whether or not a predetermined time has elapsed on the basis of time counted by the time measurement unit 130.

Hereinafter, a functional configuration of the control unit 140 will be described. The control unit 140 functions as a distribution unit 141, a photographing condition acquisition unit 142, a photographing instruction signal transmission unit 143, and a photographed image acquisition unit 144.

The distribution unit 141 receives photographing data, voice data, and the like which constitute live content from the distributor terminal 200 through the communication unit 110. The distribution unit 141 generates live content on the basis of the received distribution data, and distributes the generated live content to the viewer terminals 300 through the communication unit 110.

In addition, the distribution unit 141 generates various pieces of image data, voice data, and the like on the basis of received data from the distributor terminal 200 or the viewer terminals 300, and distributes the data to the distributor terminal 200 and the viewer terminals 300. Examples of the various pieces of image data include a photographed image that is received from the viewer terminals 300, an image obtained by processing the photographed image, and a photograph collection that is generated on the basis of a plurality of photographed images received from the viewer terminals 300. For example, the voice data is voice data that is generated on the basis of voice data received from the viewer terminals 300 and is distributed in combination with the photograph collection.

The photographing condition acquisition unit 142 receives a photographing condition from the distributor terminal 200 through the communication unit 110. According to this, the photographing condition acquisition unit 142 acquires the photographing condition. The photographing condition is a subject condition or a voice input condition that is set by a distributor. Details of the subject condition and the voice input condition will be described later. Furthermore, photographing conditions may be different from each other depending on a plurality of viewer terminals 300, or may be the same as each other.

The photographing instruction signal transmission unit 143 transmits a photographing instruction signal to the viewer terminals 300 through the communication unit 110. The photographing instruction signal is a control signal that allows the viewer terminals 300 to perform a photographing operation in a case where the viewers satisfy a photographing condition. The photographing instruction signal transmission unit 143 may distribute the photographing instruction signal to some among the plurality of viewer terminals 300. The photographing instruction signal transmission unit 143 may transmit the photographing instruction signal to only one viewer terminal 300.

The photographed image acquisition unit 144 receives a photographed image obtained by the photographing operation of the viewer terminals 300 from the viewer terminals 300 through the communication unit 110. According to this, the photographed image acquisition unit 144 acquires the photographed image.

<Configuration of Distributor Terminal>

Figure 3:
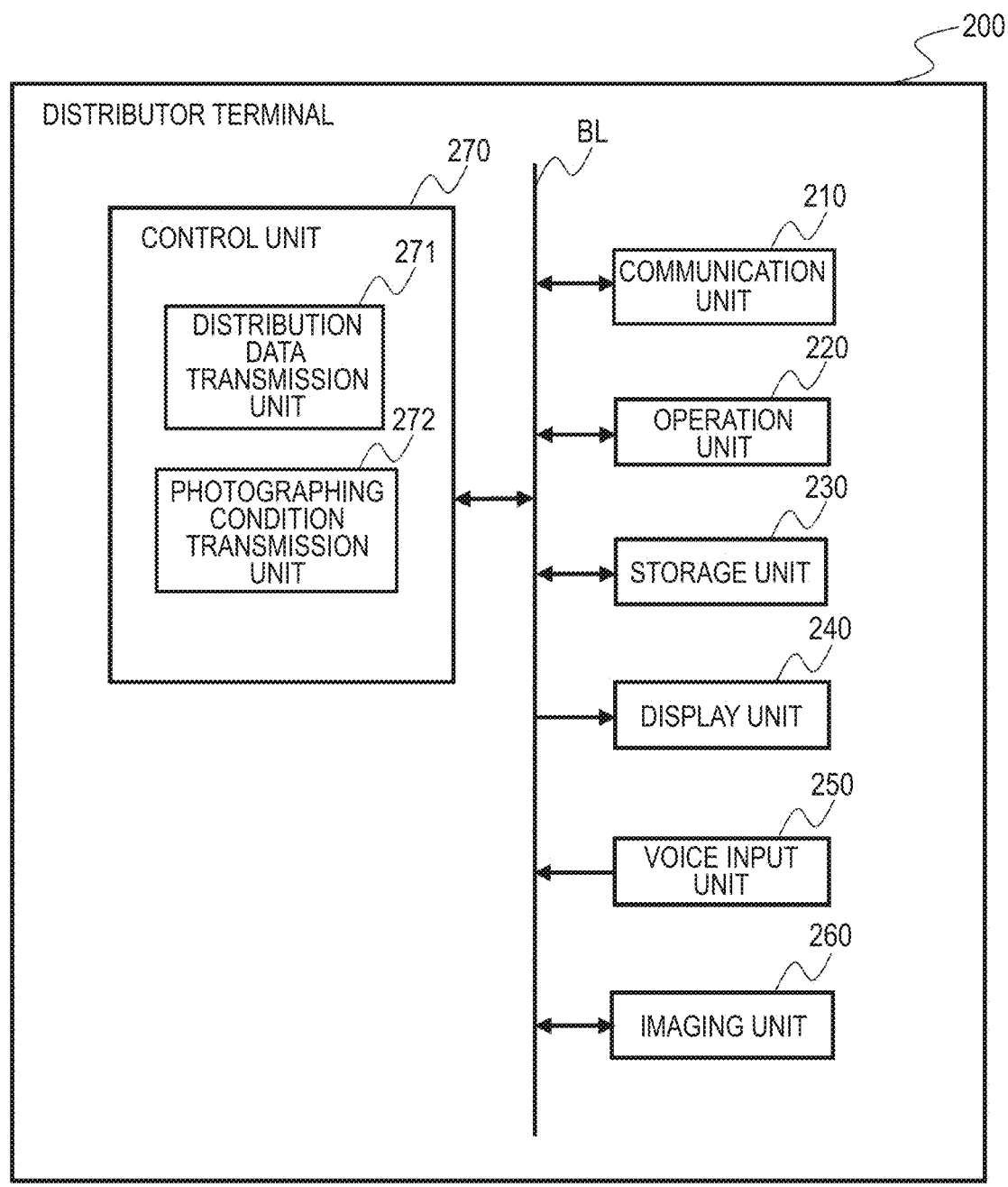
FIG. 3 is a block diagram illustrating a configuration example of a distributor terminal according to the first embodiment.

Hereinafter, a configuration of the distributor terminal 200 will be described in detail. As illustrated in FIG. 3, the distributor terminal 200 includes a communication unit 210 that performs communication with another apparatus, an operation unit 220 that accepts a user's operation, a storage unit 230 that stores various pieces of data, a display unit 240 that displays various images, a voice input unit 250 that accepts voice input, an imaging unit 260 that performs imaging, and a control unit 270 that performs control of the entirety of an apparatus. The constituent elements are connected to each other by a bus line BL.

The communication unit 210 is a communication interface that includes an NIC configured to perform wired communication or radio communication. The communication unit 210 performs communication with the server apparatus 100 through the network NW.

The operation unit 220 is an interface that includes operation buttons, a keyboard, a pointing device, or the like, and can be used by a user to input an instruction.

The storage unit 230 includes a RAM, a ROM, or the like. The storage unit 230 stores a program for executing various kinds of control processing, input data, and the like.

For example, the display unit 240 includes an LCD, an EL display, or the like. The display unit 240 displays a text, an image, and the like in correspondence with input data from the control unit 270.

The voice input unit 250 includes a microphone or the like. The voice input unit 250 accepts voice input from the outside and acquires voice data.

The imaging unit 260 is a camera that includes a lens, an image sensor, an integrated circuit, and the like. The imaging unit 260 acquires photographing data by photographing the outside. The photographing data may be still image data, or moving image data.

The control unit 270 includes a CPU, and the like. The control unit 270 controls entire operations of the distributor terminal 200 by executing the program that is stored in the storage unit 230.

Hereinafter, a functional configuration of the control unit 270 will be described. The control unit 270 functions as a distribution data transmission unit 271, and a photographing condition transmission unit 272.

The distribution data transmission unit 271 transmits distribution data to the server apparatus 100 through the communication unit 210. For example, the distribution data transmission unit 271 transmits the voice data acquired in the voice input unit 250, and the photographing data acquired in the imaging unit 260 to the server apparatus 100 as distribution data.

The photographing condition transmission unit 272 accepts photographing condition setting by a user through the operation unit 220. The photographing condition transmission unit 272 transmits a photographing condition to the server apparatus 100 through the communication unit 210.

<Configuration of Viewer Terminal>

Figure 4:
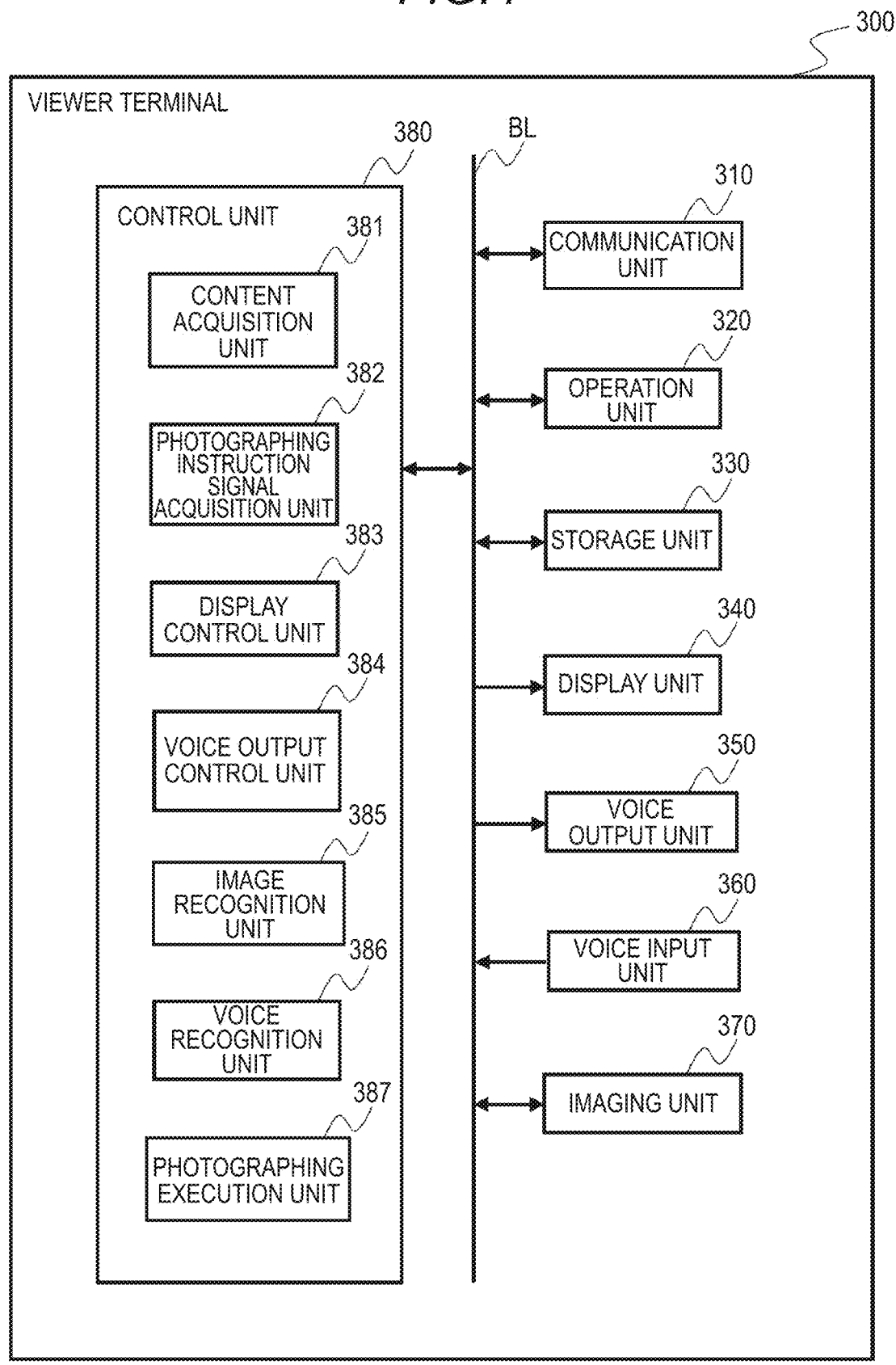
FIG. 4 is a block diagram illustrating a configuration example of a viewer terminal according to the first embodiment.

Hereinafter, a configuration of each of the viewer terminals 300 will be described in detail. As illustrated in FIG. 4, the viewer terminal 300 includes a communication unit 310 that performs communication with another apparatus, an operation unit 320 that accepts an input operation of a user, a storage unit 330 that stores various pieces of data, a display unit 340 that displays various images, a voice output unit 350 that outputs voice, a voice input unit 360 that accepts voice input, an imaging unit 370 that performs imaging, and a control unit 380 that performs control of the entirety of an apparatus. The constituent elements are connected to each other through a bus line BL.

The communication unit 310 is a communication interface that includes an NIC configured to perform wired communication or radio communication. The communication unit 310 performs communication with the server apparatus 100 through the network NW.

The operation unit 320 is an interface that includes operation buttons, a keyboard, a pointing device, or the like, and can be used by a user to input an instruction.

The storage unit 330 includes a RAM, a ROM, or the like. The storage unit 330 stores a program for executing various kinds of control processing, input data, and the like.

For example, the display unit 340 includes an LCD, an EL display, or the like. The display unit 340 displays a text, an image, and the like in correspondence with input data from the control unit 380.

The voice output unit 350 includes a speaker, an amplifier, or the like. The voice output unit 350 outputs voice in correspondence with input data from the control unit 380.

The voice input unit 360 includes a microphone or the like. The voice input unit 360 accepts voice input from the outside and acquires voice data.

The imaging unit 370 is a camera that includes a lens, an image sensor, an integrated circuit, and the like. The imaging unit 370 acquires photographing data by photographing the outside. The photographing data may be still image data, or moving image data. In this embodiment, description will be given of a case where the photographing data is a photograph, that is, still image data.

The control unit 380 includes a CPU, and the like. The control unit 380 controls entire operations of the viewer terminals 300 by executing the program that is stored in the storage unit 330.

Hereinafter, a functional configuration of the control unit 380 will be described. The control unit 380 functions as a content acquisition unit 381, a photographing instruction signal acquisition unit 382, a display control unit 383, a voice output control unit 384, an image recognition unit 385, a voice recognition unit 386, and a photographing execution unit 387.

The content acquisition unit 381 receives live content data distributed from the server apparatus 100 through the communication unit 310, and acquires the content data.

The photographing instruction signal acquisition unit 382 receives a photographing instruction signal from the server apparatus 100 through the communication unit 310, and acquires a photographing instruction signal.

The display control unit 383 controls the display unit 340 to display a text, an image, and the like. For example, the display control unit 383 allows the display unit 340 to display a video of the live content acquired by the content acquisition unit 381. In addition, the display control unit 383 allows the display unit 340 to display a photographing screen and information indicating a subject condition or a voice input condition on the basis of the photographing instruction signal acquired by the photographing instruction signal acquisition unit 382.

The voice output control unit 384 controls the voice output unit 350 to output voice. For example, the voice output control unit 384 outputs voice of the live content. The voice output unit 350 is allowed to output a predetermined notification sound in correspondence with the photographing instruction signal acquired by the photographing instruction signal acquisition unit 382.

Examples of the predetermined notification sound include a notification sound that indicates reception of the photographing instruction signal by the viewer terminals 300, a notification sound that indicates photographing completion or photographing failure, and a notification sound that indicates a photographing operation standby time. The photographing operation standby time is a predetermined time after reception of the photographing instruction signal, and is a time for which the display unit 340 displays a photographing screen.

The image recognition unit 385 performs image recognition of an image that is reflected on the imaging unit 370 (that is, an image that is reflected on a photographing screen). The image recognition unit 385 performs image recognition at the photographing operation standby time, and determines whether or not a viewer satisfies the subject condition.

The voice recognition unit 386 performs voice recognition of voice that is input to the voice input unit 360. At the photographing operation standby time, the voice recognition unit 386 performs voice recognition, and determines whether or not the viewer satisfies the voice input condition.

In a case where the viewer satisfies the photographing condition at the imaging operation standby time, the photographing execution unit 387 executes a photographing operation. Specifically, the photographing execution unit 387 controls the imaging unit 370 to perform photographing. Photographing data that represents a photograph obtained by the photographing operation is transmitted to the server apparatus 100 through the communication unit 310.

<Photographing Condition>

Figure 5:
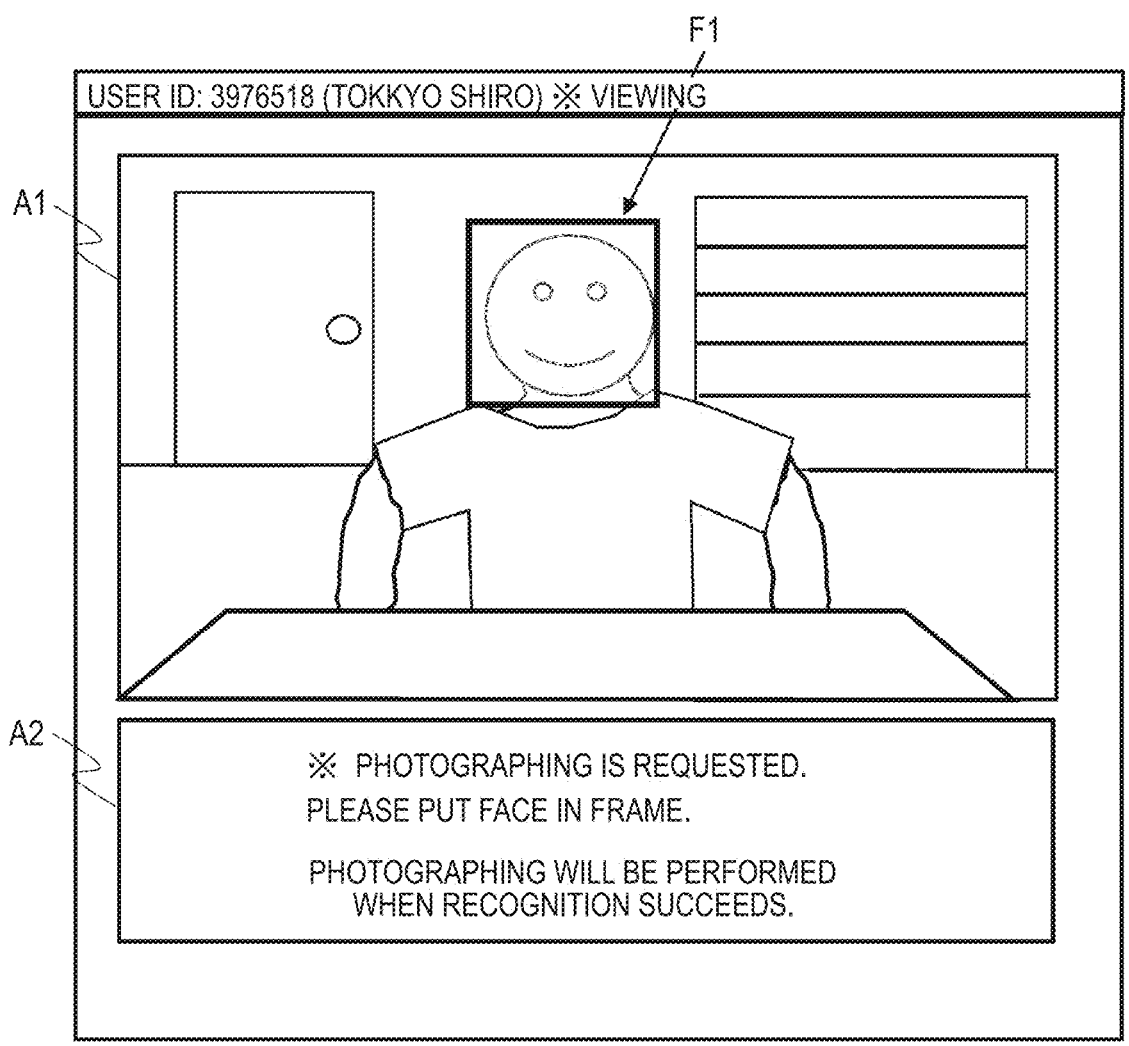
FIG. 5 is a diagram illustrating an example (a first example) of a screen that is displayed on the viewer terminal.

Hereinafter, the photographing condition will be described with reference to three examples. First, a first example of the photographing condition will be described. FIG. 5 illustrates an example (a first example) of a screen that is displayed on the viewer terminal 300. On the screen, a photographing screen A1 is displayed on an upper side, and a message box A2 describing a photographing condition is displayed on a lower side. A person who is reflected on the photographing screen A1 is a viewer. Furthermore, the photographing screen A1 is displayed only for a certain time in a case where the viewer terminal 300 receives the photographing instruction signal. At the other times, a video of live content is displayed instead of the photographing screen A1.

As a subject condition, a rectangular frame F1 is displayed on the photographing screen A1 to conform to a face of a viewer. When the face of the viewer enters the frame F1, the image recognition unit 385 determines that the subject condition is satisfied, and the photographing execution unit 387 executes a photographing operation.

In the photographing operation, the photographing execution unit 387 may acquire the entirety of an image that is reflected on the photographing screen A1 as a still image, or may acquire a still image obtained by extracting only an image portion in the frame F1. Furthermore, the frame F1 may have a size and a shape for housing a silhouette of a part or the entirety of a body of the viewer without limitation to the example illustrated in FIG. 5. For example, the frame F1 may have a shape for housing an arm of the viewer in a bent manner, or a hand shape for housing a palm.

The shape, the size, and the like of the frame F1 are set by a distributor who uses the distributor terminal 200. In the case of transmitting a photographing instruction signal to a plurality of viewer terminals 300 through the server apparatus 100, the distributor may set frames F1 different from each other to the plurality of viewer terminals 300. For example, the frame F1 may be set in a specific manner in each of the viewer terminals 300. In addition, a first frame F1 may be set to a part of the viewer terminals 300, and a frame F1 different from the first frame F1 may be set to another part of the viewer terminals 300. That is, the distributor can set the frame F1 having a plurality of patterns.

Figure 6:
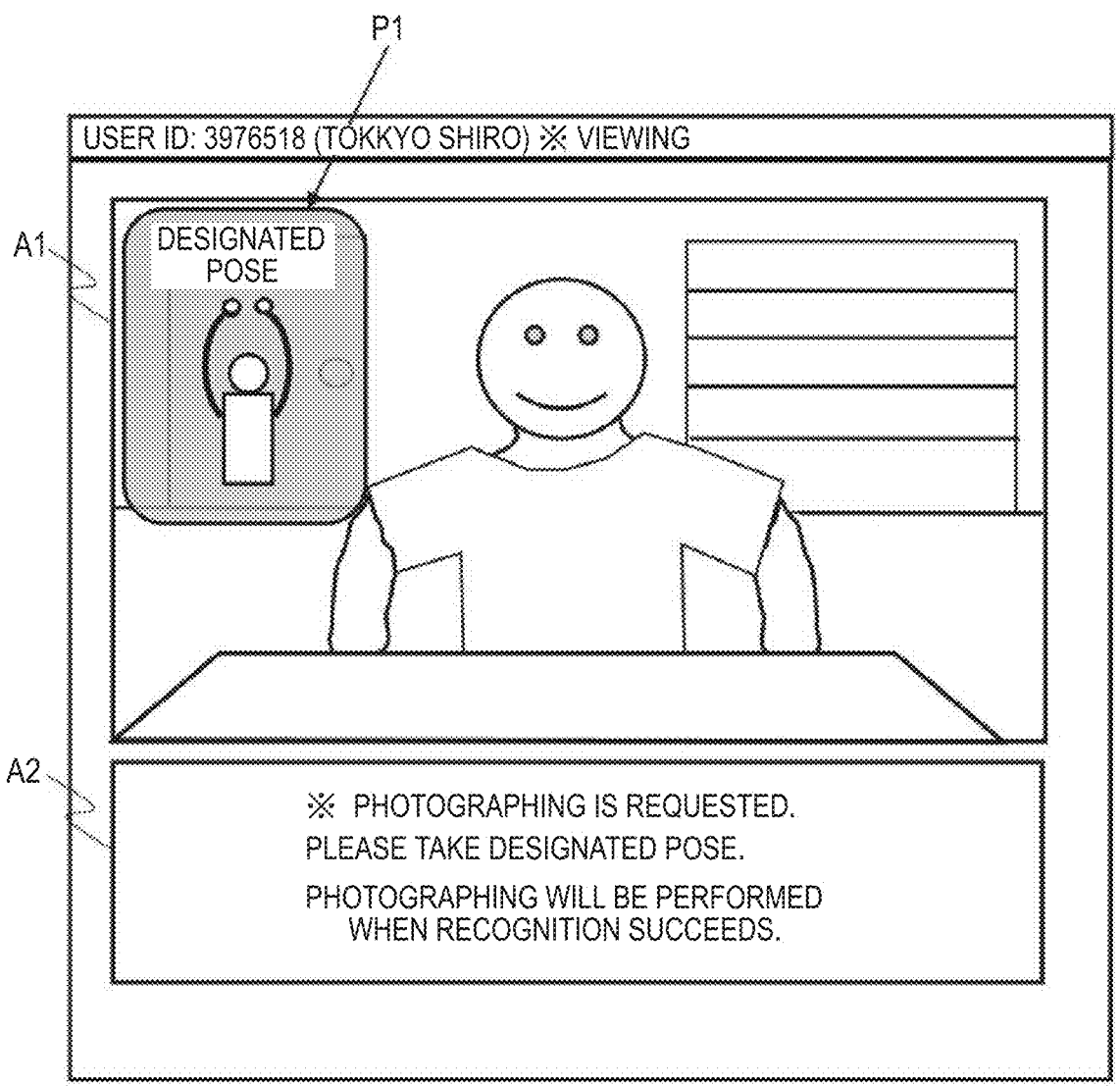
FIG. 6 is a diagram illustrating an example (a second example) of the screen that is displayed on the viewer terminal.

A second example of the photographing condition will be described. FIG. 6 illustrates an example (a second example) of the screen that is displayed on each of the viewer terminals 300. On this screen, the photographing screen A1 and the message box A2 are displayed as in FIG. 5. A person who is reflected on the photographing screen A1 is a viewer.

As the subject condition, a pose P1 which a viewer is requested to take is displayed on the photographing screen A1. When the viewer takes the same pose as the pose P1, the image recognition unit 385 determines that the subject condition is satisfied, and the photographing execution unit 387 executes a photographing operation.

In the photographing operation, the photographing execution unit 387 may acquire the entirety of an image that is reflected on the photographing screen A1 as a still image, or may acquire a still image obtained by extracting only an image portion of the viewer who is recognized. Furthermore, FIG. 6 illustrates a pose in which both hands are lifted overhead as the pose P1. However, the pose P1 may be a standing pose, a pose in which both eyes are covered with hands, and the like without limitation to the example illustrated in FIG. 6.

The pose P1 is set by a distributor who uses the distributor terminal 200. In the case of transmitting a photographing instruction signal to the plurality of viewer terminals 300 through the server apparatus 100, the distributor may set the poses P1 different from each other to the plurality of viewer terminals 300.

Figure 7:
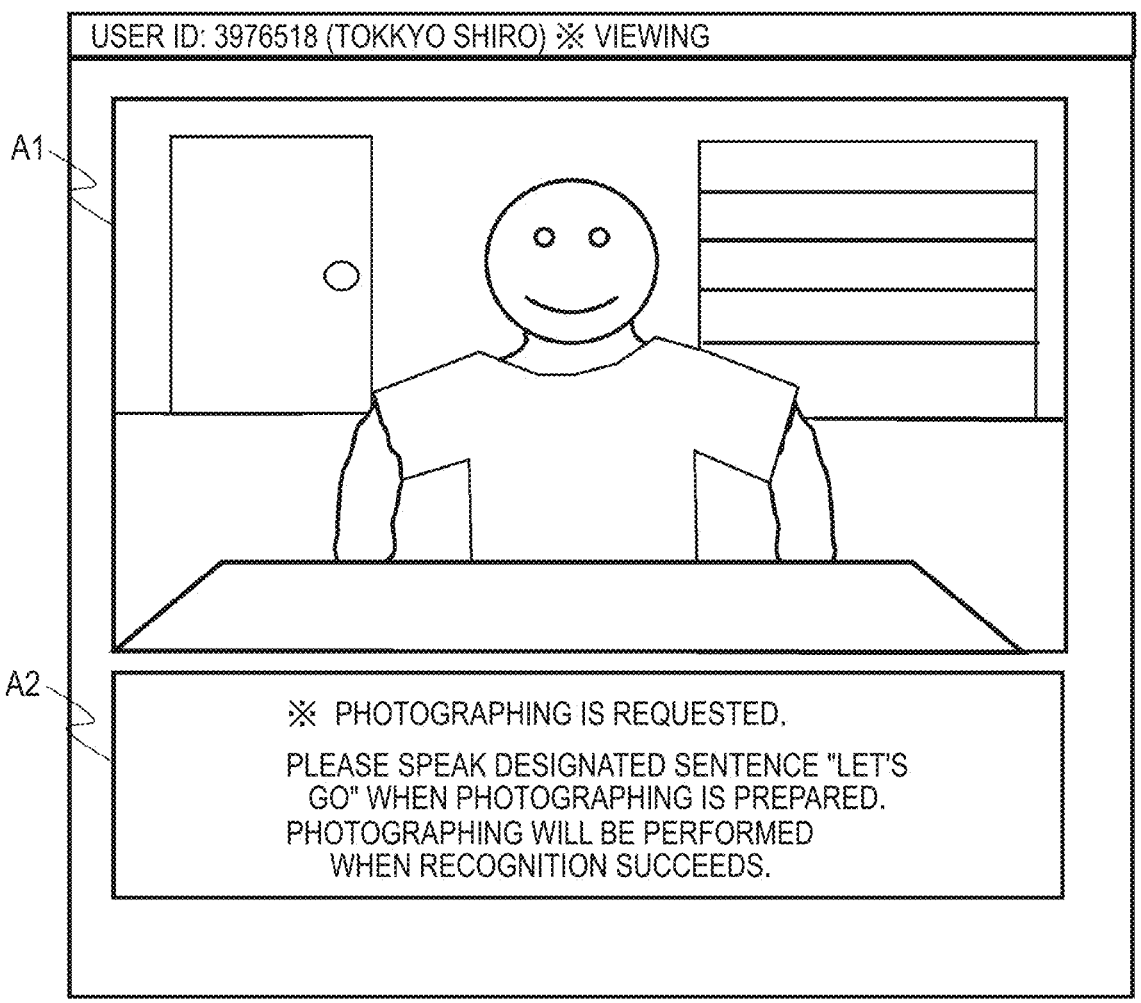
FIG. 7 is a diagram illustrating an example (a third example) of the screen that is displayed on the viewer terminal.

A third example of the photographing condition will be described. FIG. 7 illustrates an example (a third example) of the screen that is displayed on each of the viewer terminals 300. On the screen, the photographing screen A1 and the message box A2 are displayed as in FIG. 5. A person who is reflected on the photographing screen A1 is a viewer.

As voice input condition, a sentence which is input by a viewer with voice is displayed in the message box A2. In this example, the sentence is "let's go". When the viewer reads the sentence, the voice recognition unit 386 determines that the voice input condition is satisfied, and the photographing execution unit 387 executes a photographing operation. In the photographing operation, the photographing execution unit 387 acquires the entirety of an image that is reflected on the photographing screen A1 as a still image.

The sentence is set by a distributor who uses the distributor terminal 200. In the case of transmitting a photographing instruction signal to the plurality of viewer terminals 300 through the server apparatus 100, the distributor may set sentences different from each other to the plurality of viewer terminals 300.

<Processing Flow>

Figure 8:
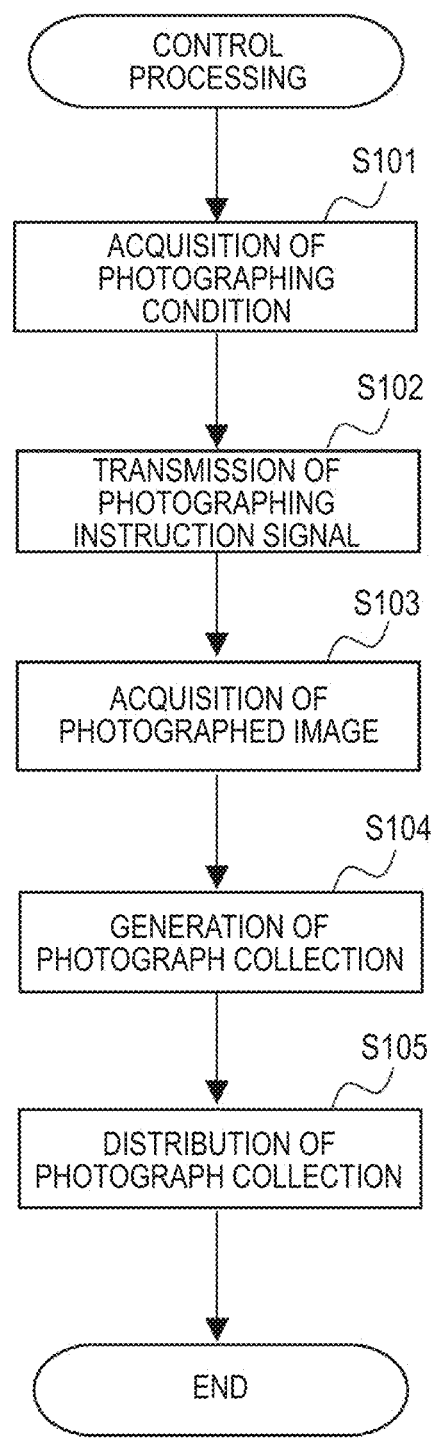
FIG. 8 is a flowchart illustrating an example of control processing that is executed by the server apparatus according to the first embodiment.

Hereinafter, description will be given of an example of control processing that is executed by the server apparatus 100 with reference to FIG. 8. The processing is executed when the distributor terminal 200 logs on the server apparatus 100 and initiates distribution of live content as a trigger. Furthermore, here, description will be given of an example in which the server apparatus 100 collects photographed images from the plurality of viewer terminals 300, and distributes a photograph collection generated on the basis of the photographed images.

First, the photographing condition acquisition unit 142 of the control unit 140 acquires a photographing condition that is set by a distributor from the distributor terminal 200 (step S101). Here, description will be given of a case where the photographing condition set by the distributor is the subject condition described in the first example.

Next, the photographing instruction signal transmission unit 143 of the control unit 140 generates a photographing instruction signal on the basis of the photographing condition that is acquired, and transmits the photographing instruction signal to the plurality of viewer terminals 300 (step S102). Furthermore, in a case where the photographing condition is set for each of the viewer terminals 300, photographing instruction signals different from each other are transmitted to the respective viewer terminals 300.

Each of the viewer terminals 300 which receive the photographing instruction signal displays the frame F1 for housing a silhouette of a part of a body of the viewer on the photographing screen A1 as the subject condition. At this time, the viewer terminal 300 may output a predetermined notification sound. In the case of recognizing that a silhouette of a part of a body of the viewer enters the frame F1, the viewer terminal 300 executes a photographing operation. The frame F1 is continuously displayed for a time until execution of the photographing operation is completed, or the photographing standby time is terminated. The viewer terminal 300 transmits a photographed image obtained by the photographing operation to the server apparatus 100.

The photographed image acquisition unit 144 of the control unit 140 acquires the photographed image obtained by the photographing operation from the viewer terminal 300 through the communication unit 110 (step S103). In a case where the plurality of viewer terminals 300 are executing the photographing operation, the photographed image acquisition unit 144 of the control unit 140 collects all of the photographed images.

Figure 9:
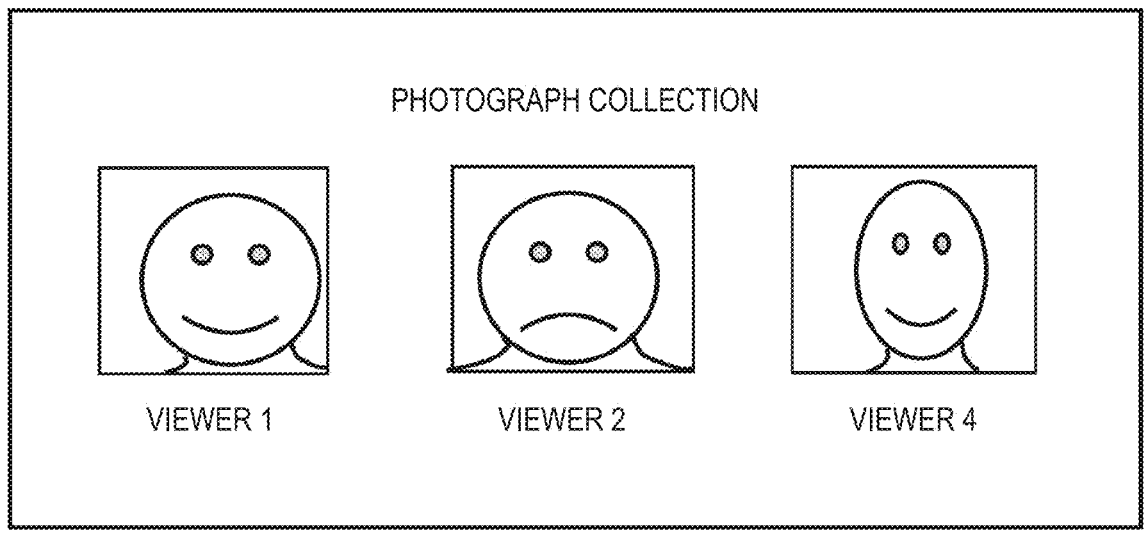
FIG. 9 is a diagram illustrating an example of a photograph collection that is distributed by the server apparatus according to the first embodiment.

The distribution unit 141 of the control unit 140 generates a photograph collection on the basis of the photographed images which are acquired (step S104). For example, FIG. 9 illustrates a photograph collection that is generated on the basis of photographed images acquired from three viewer terminals 300. In this example, the photographed images are images obtained by extracting an image portion (a facial portion of a viewer) in the frame F1. The distribution unit 141 of the control unit 140 may generate a photograph collection in which a plurality of photographed images are arranged in parallel as in this example, or may generate a photograph collection in which a plurality of photographed images are sequentially display like a slide show.

The distribution unit 141 of the control unit 140 distributes the generated photograph collection to a distribution destination through the communication unit 110 (step S105). The distribution destination may be the entirety of the viewer terminals 300 which are connected through the network NW, or a part of the viewer terminal 300. In addition, the distribution destination may include not only the viewer terminals 300 but also the distributor terminal 200.

According to the distribution system 1 according to this embodiment, for example, a distributor can suggest that a viewer creates a photograph collection, and can set a photographing condition. A photographing instruction signal that is generated on the basis of the photographing condition allows the viewer terminals 300 to display the frame F1, the pose P1, or voice input condition as a sign. A photographing standby time for which the viewer terminals 300 perform the display is initiated after receiving the photographing instruction signal, and the time is limited.

In this case, a time for which the viewer considers whether or not to respond to photographing is shorter. According to this, it is possible to guide the viewer so that the viewer is likely to agree with a photographing action. Particularly, when the distributor makes a request for the viewer to input a sentence, to take a pose, or the like, a characteristic photograph collection can be generated on the basis of the request. Accordingly, the distributor can smoothly perform collection of a photographed image from the viewer by providing a motive having entertainment characteristics to the viewer.

Second Embodiment

In this embodiment, description will be given of a distribution system 2 that generates a group photograph and distributes the group photograph. Furthermore, in the following description, the same reference numeral will be given to a constituent element that is common to the distribution system 1 according to the first embodiment.

Figure 10:
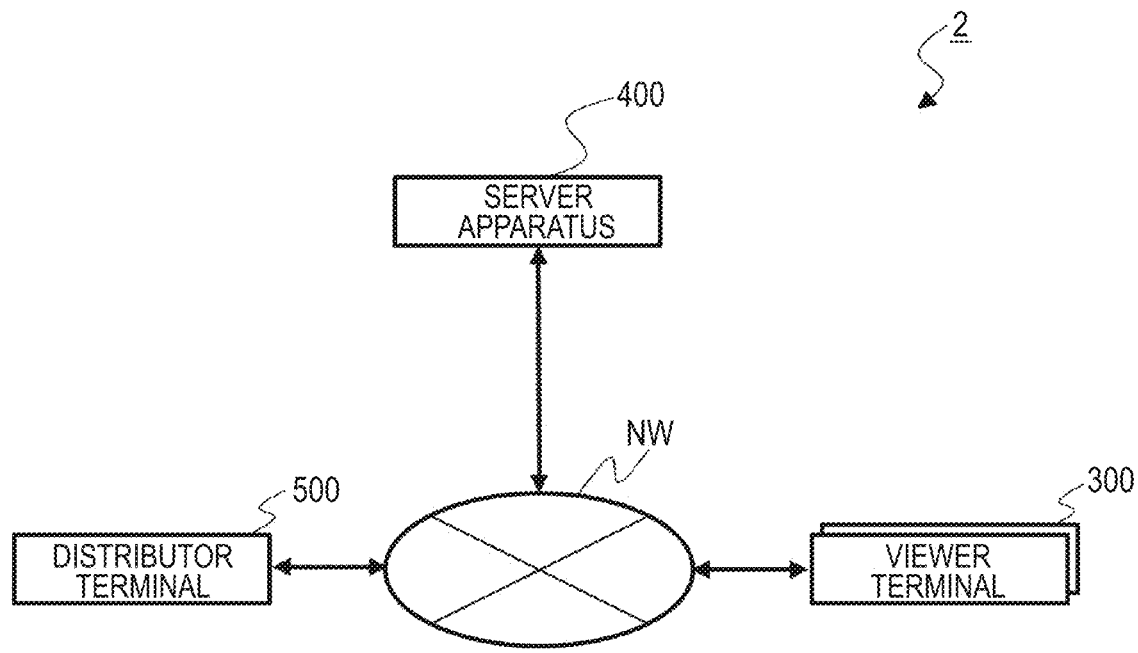
FIG. 10 is a diagram illustrating a configuration example of a distribution system according to a second embodiment.

As illustrated in FIG. 10, the distribution system 2 includes a server apparatus 400, a distributor terminal 500, and a plurality of viewer terminals 300. The server apparatus 400, the distributor terminal 500, and the viewer terminals 300 are connected in a communication-possible manner through a network NW.

Figure 11:
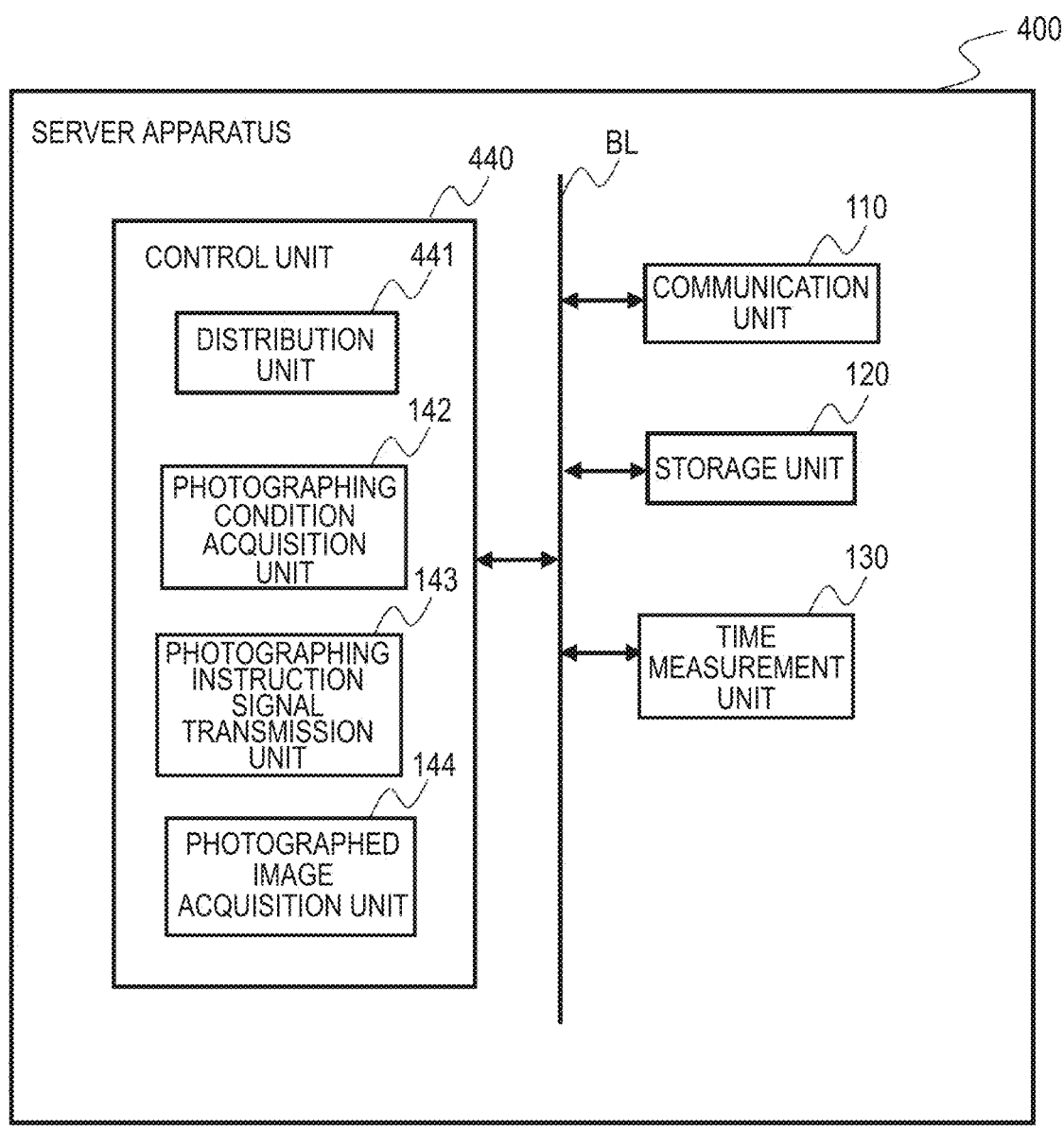
FIG. 11 is a block diagram illustrating a configuration example of a server apparatus according to the second embodiment.

As illustrated in FIG. 11, the server apparatus 400 includes a communication unit 110, a storage unit 120, a time measurement unit 130, and a control unit 440. A distribution unit 441 of the control unit 440 is different from the distribution unit 141 of the server apparatus 100 according to the first embodiment in that the distribution unit 441 generates a group photograph and distributes the group photograph that is generated.

Figure 12:
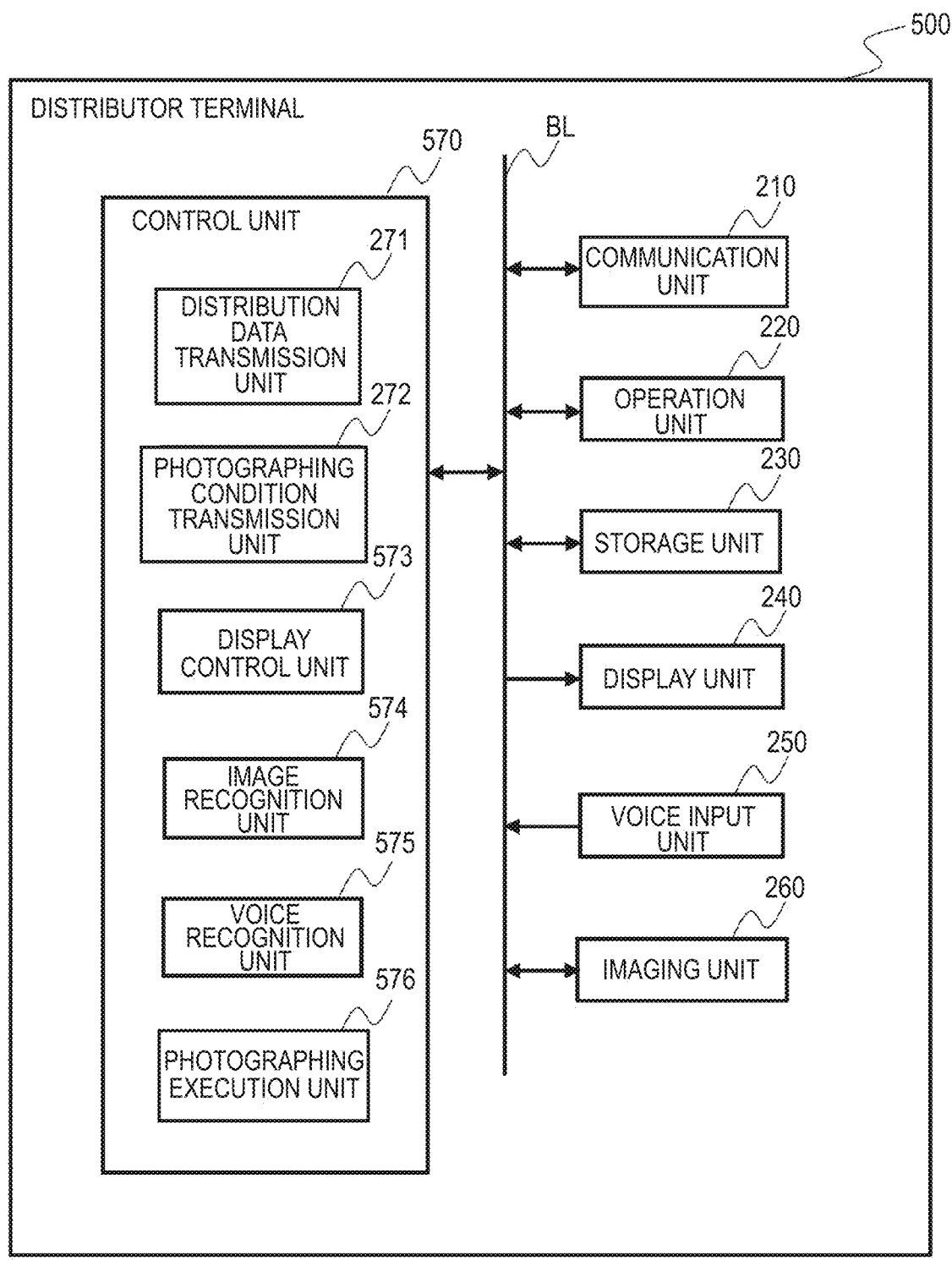
FIG. 12 is a block diagram illustrating a configuration example of a distributor terminal according to the second embodiment.

As illustrated in FIG. 12, the distributor terminal 500 includes a communication unit 210, an operation unit 220, a storage unit 230, a display unit 240, a voice input unit 250, an imaging unit 260, and a control unit 570. The control unit 570 is different from the control unit 270 of the server apparatus 100 according to the first embodiment in that the control unit 570 includes a display control unit 573, an image recognition unit 574, a voice recognition unit 575, and a photographing execution unit 576.

The display control unit 573 controls the display unit 240 to display a text, an image, and the like. For example, the display control unit 573 allows the display unit 240 to display a photographing screen of live content that is distributed. In addition, the display control unit 573 allows the display unit 240 to display information indicating a subject condition or a voice input condition, which is set through the operation unit 220, for a distributor.

The image recognition unit 574 performs image recognition of an image that is reflected on the imaging unit 260 (that is, an image that is reflected on a photographing screen). The image recognition unit 574 performs image recognition at a predetermined photographing operation standby time, and determines whether or not a distributor satisfies the subject condition. The photographing operation standby time of the distributor terminal 500 may be initiated at a timing at which the photographing condition transmission unit 272 transmits a photographing condition, or may be initiated at a timing at which the distributor gives an instruction for execution of a photographing operation through the operation unit 220.

The voice recognition unit 575 performs voice recognition of voice that is input to the voice input unit 250. The voice recognition unit 575 performs voice recognition at the predetermined photographing operation standby time, and determines whether or not the distributor satisfies a voice input condition.

In a case where the distributor satisfies the subject condition or the voice input condition, the photographing execution unit 576 controls the imaging unit 260 to execute a photographing operation. Furthermore, the photographing execution unit 576 may execute the photographing operation at a timing at which the distributor gives an instruction for execution of the photographing operation through the operation unit 220. The photographing operation of the distributor terminal 500 is an operation of acquiring a part or the entirety of a photographing screen of live content that is distributed as a still image at a photographing execution timing. In addition, the photographing execution unit 576 transmits the photographed image obtained by the photographing operation to the server apparatus 400 through the communication unit 210.

Furthermore, for example, as in the subject condition of the viewer terminal 300, the image recognition unit 574 determines that the subject condition is satisfied in accordance with whether or not the distributor houses a silhouette of a part of a body in the frame F1, whether or not the distributor takes the pose P1, and the like. For example, as in the voice input condition of the viewer terminal 300, the voice recognition unit 575 determines whether or not the voice input condition is satisfied in accordance with whether or not the distributor reads a sentence that is set.

<Processing Flow>

Figure 13:
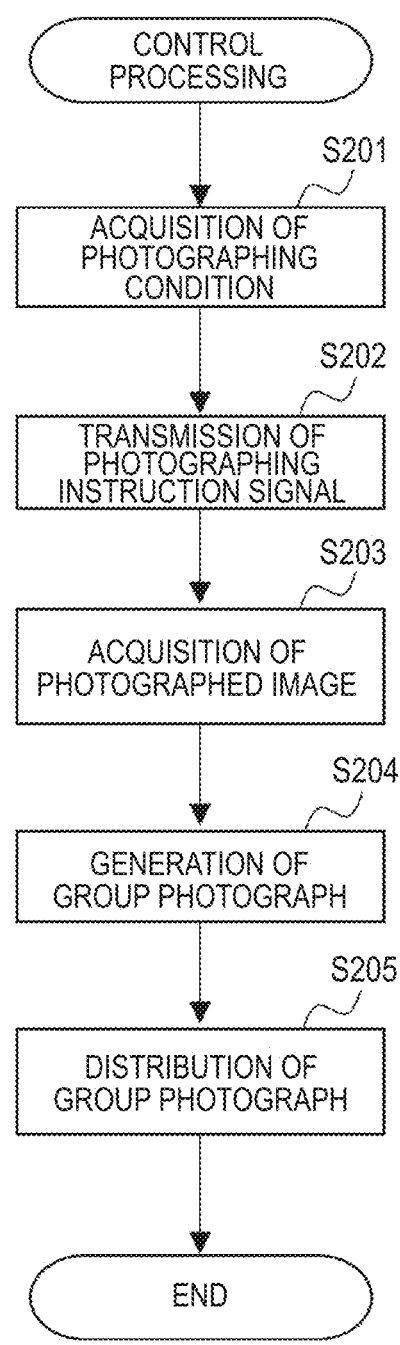
FIG. 13 is a flowchart illustrating an example of control processing that is executed by the server apparatus according to the second embodiment.

Hereinafter, description will be given of an example of control processing that is executed by the server apparatus 400 with reference to FIG. 13. The processing is executed when the distributor terminal 500 logs on the server apparatus 400 and initiates distribution of live content as a trigger. Furthermore, here, description will be given of an example in which the server apparatus 400 collects photographed images from the distributor terminal 500 and the plurality of viewer terminals 300, and distributes a group photograph generated on the basis of the photographed images.

First, the photographing condition acquisition unit 142 of the control unit 440 acquires a photographing condition set by the distributor from the distributor terminal 200 (step S201). Here, description will be given of a case where the photographing condition set by the distributor is the subject condition described in the first example. In addition, with regard to the distributor terminal 500, description will be given of a case where the subject condition is set as the photographing condition.

Furthermore, the distributor terminal 500 which transmits the photographing condition to the server apparatus 400 determines whether or not a photographing standby time is initiated, the image recognition unit 574 performs image recognition, and the distributor satisfies the subject condition. In a case where the distributor satisfies the subject condition, the photographing execution unit 576 of the distributor terminal 500 controls the imaging unit 260 to execute a photographing operation.

Next, the photographing instruction signal transmission unit 143 of the control unit 440 generates a photographing instruction signal on the basis of the acquired photographing condition, and transmits the generated photographing instruction signal to the plurality of viewer terminals 300 (step S202). Furthermore, in a case where the photographing condition is set for each of the viewer terminals 300, photographing instruction signals different from each other are transmitted to the respective viewer terminals 300.

Each of the viewer terminals 300 which receive the photographing instruction signal displays the frame F1 for housing a silhouette of a part of a body of the viewer on the photographing screen A1 as the subject condition. At this time, the viewer terminal 300 may output a predetermined notification sound. In the case of recognizing that a silhouette of a part of a body of the viewer enters the frame F1, the viewer terminal 300 executes a photographing operation. The frame F1 is continuously displayed for a time until execution of the photographing operation is completed, or the photographing standby time is terminated. The viewer terminal 300 transmits a photographed image obtained by the photographing operation to the server apparatus 400.

The photographed image acquisition unit 144 of the control unit 440 acquires the photographed image obtained by the photographing operation from each of the distributor terminal 500 and the plurality of viewer terminals 300 through the communication unit 110 (step S203).

Figure 14:
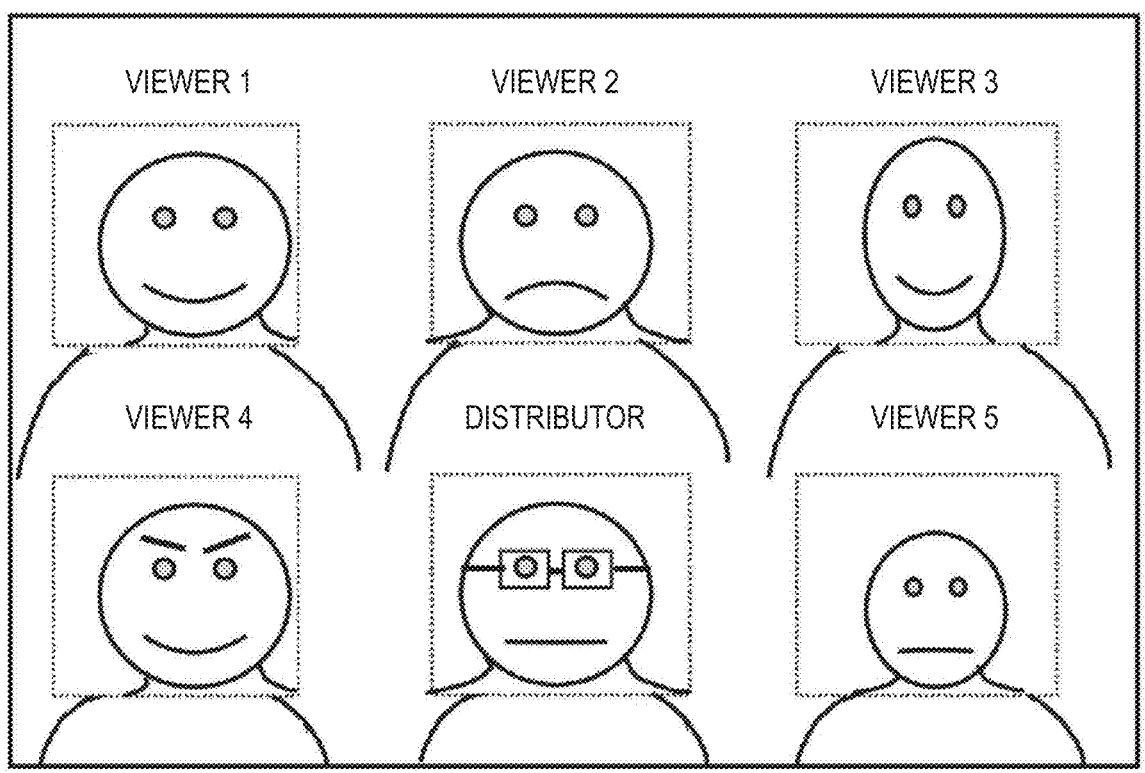
FIG. 14 is a diagram illustrating an example of an image illustrating a group photograph that is distributed by the server apparatus according to the second embodiment.

The distribution unit 441 of the control unit 440 generates a group photograph on the basis of the collected photographed images (step S204). For example, FIG. 14 illustrates the group photograph that is generated on the basis of the photographed image acquired from five viewer terminals 300, and the photographed image acquired from the distributor terminal 500.

In this example, the photographed image is an image obtained by extracting an image portion (a facial portion of the viewer or the distributor) in the frame F1. The group photograph is generated combining photographed images of facial portions of the distributor and viewers 1, 2, 3, 4, and 5 to a background image that is generated on the basis of the total number of persons including the distributor and the viewers. The distribution unit 441 of the control unit 440 generates a group photograph in which a plurality of photographed images are arranged in parallel as in this example.

The distribution unit 441 of the control unit 440 distributes the generated group photograph to a distribution destination through the communication unit 110 (step S205). The distribution destination may be the entirety of the viewer terminals 300 which are connected through the network NW, or a part of the viewer terminal 300. In addition, the distribution destination may include not only the viewer terminals 300 but also the distributor terminal 500.

According to the distribution system 2 according to this embodiment, for example, a distributor can suggest that a viewer creates a group photograph, and can set a photographing condition. A photographing instruction signal that is generated on the basis of the photographing condition allows the viewer terminals 300 to display the frame F1, the pose P1, or a voice input condition as a sign. A photographing standby time for which the viewer terminals 300 perform the display is initiated after receiving the photographing instruction signal, and the time is limited.

In this case, a time for which the viewer considers whether or not to respond to photographing is shorter. According to this, it is possible to guide the viewer so that the viewer is likely to agree with a photographing action. Particularly, when the distributor makes a request for the viewer to input a sentence, to take a pose, or the like, a characteristic group photograph can be generated on the basis of the request. In addition, in the case of generating the group photograph in which the distributor and a plurality of viewers are photographed together, the viewers can obtain the group photograph that is unique to a distribution service, and thus the viewers are likely to participate in a photographing action. As a result, the distributor can smoothly perform collection of a photographed image from the viewer by providing a motive having entertainment characteristics to the viewer.

Description of the embodiments will now be terminated, but the above-described embodiments are merely examples. Accordingly, specific configurations of the distribution systems 1 and 2, the content of processing, and the like are not limited to description of the embodiments. Hereinafter, modification examples of the embodiments will be described.

First, the voice input condition is not limited to the condition described in the embodiments. For example, in the case of setting sentences different from each other to the plurality of viewer terminals 300, the sentence may be a part of scenario that is completed in combination with a sentence of another viewer. For example, among the plurality of viewer terminals 300, a sentence that is displayed on a first viewer terminal 300 may be "a distributor A is a popular person", a sentence that is displayed on a second viewer terminal 300 may be "however, the distributor A has a lot of enemies", a sentence that is displayed on a third viewer terminal 300 may be "therefore, everyone, let's cheer for the distributor A".

In this case, the photographing execution unit 387 of the viewer terminal 300 may transmit not only the photographing data acquired in the photographing operation but the voice data that is input in correspondence with the voice input condition to the server apparatus 100 or 400 through the communication unit 310. In this case, the server apparatus 100 or 400 is provided with not only the photographed image acquisition unit 144 but also a voice data acquisition unit that acquires voice data received through the communication unit 310.

According to the above-described configuration, the server apparatus 100 or 400 can acquire the photographing data and the voice data from each of the viewer terminals 300, and can generate a photograph collection having story characteristics by combining the photographing data and the voice data with each other. In this case, the server apparatus 100 or 400 can distribute the photograph collection or the group photograph which is combined with the voice data.

In addition, the sentence may be a response to a title prepared by the distributor. For example, in a case where the distributor reads an upper phrase of passwords, with regard to the voice input condition of the viewer terminals 300, a lower phrase with respect to the upper phrase may be the sentence. In addition, the sentence may be a response to an inquiry of a quiz prepared by the distributor.

In the embodiments, the server apparatus 100 or 400 may distribute the acquired photographed image as is instead of the photograph collection or the group photograph. In addition, in the embodiments, description has been given of an example in which the distributor terminal 500 or the viewer terminals 300 are allowed to perform the photographing operation once, but there is no limitation thereto. For example, the photographing condition may be transmitted to one viewer terminal 300, and the viewer terminal 300 may be allowed to repetitively execute the photographing operation. In this case, the server apparatus 100 or 400 may generate the photograph collection by acquiring a plurality of photographed images from the viewer terminal 300.

In the first embodiment, the server apparatus 100 does not acquire a photographed image from the distributor terminal 200, and generates the photograph collection by only the photographed image acquired from the viewer terminals 300. However, the server apparatus 100 may acquire a photographed image that is photographed by the distributor terminal 200, and may add the photographed image to the photograph collection. In the second embodiment, the server apparatus 400 acquires the photographed image that is photographed by the distributor terminal 500, and the photographed image is included in the group photograph. However, the group photograph may be generated by only the photographed image collected from the plurality of viewer terminals 300.

In the embodiments, the photographing instruction signal transmission unit 143 of the server apparatus 100 or 400 may allow the viewer terminals 300 to display a sentence that becomes a voice input condition when the distributor reads a title such as the inquiry of the quiz and the upper phrase of the passwords as a trigger.

To realize the operation as described above, for example, the distributor terminal 200 or 500 is provided with a voice recognition unit that determines whether or not a voice input condition for the distributor is satisfied. In a case where the voice recognition unit of the distributor terminal 200 or 500 determines that the voice input condition is satisfied, the distributor terminal 200 or 500 notifies the server apparatus 100 or 400 of transmission instruction of a photographing instruction signal. On the basis of the notification, the photographing instruction signal transmission unit 143 of the server apparatus 100 or 400 can allow the viewer terminal 300 to display a sentence that becomes the voice input condition.

In the embodiments, a subject that becomes a photographing target is a human being (a viewer or a distributor). However, the subject is not limited to a human being. For example, the subject may be a pet, an ornament, an object, and the like. For example, the distributor may set the voice input condition as the photographing condition, and the viewer or the distributor may dispose the subject at a display position on the photographing screen A1 and may input voice that becomes the voice input condition to photograph the subject. In this case, it is not necessary to perform image recognition to determine what a subject is, and thus the subject may be an arbitrary subject.

In the embodiments, in a case where the photographing condition set by the distributor is the voice input condition described in the third example, the frame F1 is not displayed on the photographing screen A1. However, even when the photographing condition is the voice input condition, the distributor terminal 200 or 500, or the viewer terminals 300 may display the frame F1 on the photographing screen A1. According to the configuration, the distributor or the viewer can respond to a photographing operation after extracting an image portion in the frame F1 and recognizing that the image becomes a photographed image.

In the embodiments, it is possible to employ a configuration in which the server apparatus 100 or 400 distributes the photograph collection, the group photograph, the photographed image, and the like only to a viewer terminal 300 which has executed the photographing operation, and does not distribute the photograph collection, the group photograph, the photographed image, and the like to viewer terminals 300 which did not execute the photographing operation. In this case, a viewer who desires the photograph collection, the group photograph, the photographed image, and the like, which are distributed, is likely to respond to the photographing operation. Accordingly, it is possible to make collection of the photographed image from the viewer smoother. In addition, the distribution unit 141 or 441 of the server apparatus 100 or 400 may distribute an image obtained by processing the photographed image to the distributor terminal 200 or 500, or the viewer terminals 300.

In the above-described embodiment, the viewer terminals 300 may display a screen for confirming whether or not the photographed image may be transmitted before transmitting the photographed image to the server apparatus 100 or 400. The viewer terminals 300 may accept an operation of stopping transmission of the photographed image during displaying the screen. According to the configuration, a viewer can stop transmission of the photographed image in a case where the viewer does not desire to transmit the photographed image (for example, in a case where the viewer cannot perform photographing successfully).

In addition, in the embodiments, the viewer terminals 300 may display a screen for confirming whether or not the photographed image may be distributed before the server apparatus 100 or 400 distributes the photographed image. The viewer terminals 300 may transmit a distribution stopping instruction to the server apparatus 100 or 400 after accepting an operation of stopping distribution of the photographed image during displaying the screen. According to the configuration, the viewer can stop distribution of the photographed image in a case where the viewer does not desire to distribute the photographed image (for example, in a case where a viewer's mind is changed after execution of the photographing operation).

In the distribution systems 1 and 2 according to the embodiments, the distributor terminal 200 or 500, and the viewer terminals 300 are set to have configurations different from each other so as to be discriminated from each other. However, the configuration of the distributor terminal 200 or 500, and the configuration of the viewer terminals 300 may be combined with each other, and the resultant apparatus may be allowed to function as the distributor terminal or the viewer terminal.

In addition, the function of the distribution systems according to the disclosure may be realized, for example, when a computer executes a program without depending on the above-described apparatus. The program that realizes the function of the distribution systems may be stored in a computer-readable recording medium such as a universal serial bus (USB) memory, a compact disc-read only memory (CD-ROM), a digital versatile disc (DVD), and a hard disc drive (HDD), or may be downloaded to the computer through a network.

Hereinbefore, preferred embodiments of the disclosure have been described. However, the disclosure includes invention described in the appended claims and an equivalent range thereof without limitation to the specific embodiments according to the disclosure. In addition, the configurations of the apparatus described in the embodiments and the modification examples can be appropriately combined as long as technical contradiction does not occur.

The invention claimed is:

1. A photographic image distribution system that performs communication with a distributor terminal that is used by a distributor of live content, and a viewer terminal that is used by a viewer of the live content, comprising:
 a time measurement unit that generates at least one clock signal and at least one counter circuit in order to count a time on the basis of the number of pulses of the clock signal;
 a photographing condition acquisition unit that acquires a photographing condition set by the distributor from the distributor terminal;
 a photographing instruction signal transmission unit that transmits a photographing instruction signal, which allows a photographing operation to be automatically executed in a case where the viewer satisfies the photographing condition, to the viewer terminal;
 a photographing execution unit that receives the photographing instruction signal, said photographing execution unit configured to associate the photographing instruction with a predetermined clock time and determine a predetermined time measurement value between an initiation time of the live content and the predetermined clock time, and executes the photographing operation at the predetermined time based on the time provided by the time measurement unit reaching the predetermined time measurement value; and
 a photographed image acquisition unit that acquires a photographed image obtained by the photographing operation from the viewer terminal, wherein
 the photographing condition is a subject condition, and
 the photographing instruction signal transmission unit allows a pose including a body expression, which the viewer is requested to take, to be displayed on a photographing screen of the viewer terminal as the subject condition, and allows the viewer terminal to execute the photographing operation in a case where the viewer terminal recognizes that the viewer takes the pose, wherein the viewer terminal is configured to recognize that the viewer has taken the pose based on a detection, by the viewer terminal, of body expression aspects comprising at least one of an arm orientation or a hand configuration.

2. The photographic image distribution system according to claim 1, further comprising:
a distribution unit that distributes the photographed image, which is acquired from each of a plurality of viewer terminals by the photographed image acquisition unit, to the plurality of viewer terminals.

3. The photographic image distribution system according to claim 2,
wherein the distribution unit distributes an image obtained by processing the photographed image to the plurality of viewer terminals.

4. The photographic image distribution system according to claim 2,
wherein the photographed image acquisition unit acquires the photographed image from each of the plurality of viewer terminals, and
the distribution unit distributes a photograph collection or a group photograph which is generated on the basis of the acquired photographed image.

5. The photographic image distribution system according to claim 4,
wherein the photograph collection or the group photograph includes an image based on a photographed image that is photographed by the distributor terminal.

6. The photographic image distribution system according to claim 1,
wherein the photographing condition is a subject condition, and
the photographing instruction signal transmission unit allows a frame for housing a silhouette of a part or the entirety of a body of the viewer to be displayed on a photographing screen of the viewer terminal as the subject condition, and allows the viewer terminal to execute the photographing operation in a case where the viewer terminal recognizes that the silhouette of the viewer enters the frame.

7. The photographic image distribution system according to claim 6,
wherein the photographing instruction signal transmission unit allows the frame, which is different depending on each of a plurality of viewer terminals, to be displayed.

8. The photographic image distribution system according to claim 6,
wherein the photographed image, which is acquired from the viewer terminal by the photographed image acquisition unit, is an image obtained by extracting an image portion in the frame.

9. The photographic image distribution system according to claim 1,
wherein the photographing instruction signal transmission unit allows a pose, which is different depending on a plurality of viewer terminals, to be displayed.

10. The photographic image distribution system according to claim 1,
wherein the photographing condition is a voice input condition, and
wherein the viewer terminal is configured to display a sentence, and wherein the voice input condition is a condition of the viewer inputting the sentence with voice after the sentence is displayed.

11. The photographic image distribution system according to claim 10,
wherein the sentence is a part of a scenario that is completed in combination with a sentence of the distributor or another viewer.

12. The photographic image distribution system according to claim 10,
wherein the sentence is a response to a word or phrase that is prepared by the distributor.

13. The photographic image distribution system according to claim 12,
wherein the photographing instruction signal transmission unit allows the viewer terminal to display the sentence when the distributor reads the word or phrase as a trigger.

14. The photographic image distribution system according to claim 10, further comprising:
a distribution unit that distributes the photographed image, which is acquired from each of a plurality of viewer terminals by the photographed image acquisition unit, to the plurality of viewer terminals; and
a voice data acquisition unit that acquires voice data that represents voice input by each of a plurality of the viewers from each of the plurality of viewer terminals,
wherein the photographed image acquisition unit acquires the photographed image from each of the plurality of viewer terminals, and
the distribution unit distributes a photograph collection or a group photograph which is generated on the basis of the photographed image and the voice data which are acquired.

15. A distribution system, comprising:
a distributor terminal that is used by a distributor of live content;
a time measurement unit that generates at least one clock signal and at least one counter circuit in order to count a time on the basis of the number of pulses of the clock signal;
a viewer terminal that is used by a viewer of the live content;
a photographic image distribution system that performs communication with the distributor terminal and the viewer terminal, and
a photographing execution unit:
wherein the distributor terminal transmits a photographing condition, which is set by the distributor, to the photographic image distribution system,
the photographic image distribution system transmits a photographing instruction signal, which allows a photographing operation to be automatically executed in a case where the viewer satisfies the photographing condition, to the viewer terminal,
the photographing execution unit receives the photographing instruction, said photographing execution unit configured to associate the photographing instruction with a predetermined clock time and determine a predetermined time measurement value between an initiation time of the live content and the predetermined clock time, and executes the photographing operation at the predetermined time based on the time provided by the time measurement unit reaching the predetermined time measurement value, and
the viewer terminal transmits a photographed image obtained by the photographing operation to the photographic image distribution system, wherein
the photographing condition is a subject condition, and
the photographing instruction signal transmission unit allows a pose including a body expression, which the viewer is requested to take, to be displayed on a photographing screen of the viewer terminal as the subject condition, and allows the viewer terminal to execute the photographing operation in a case where the viewer terminal recognizes that the viewer takes the pose, wherein the viewer terminal is configured to recognize that the viewer has taken the pose based on a detection, by the viewer terminal, of body expression aspects comprising at least one of an arm orientation or a hand configuration.

16. The distribution system according to claim 15, wherein the viewer terminal displays a screen for confirming whether or not the photographed image is transmitted before transmitting the photographed image to the photographic image distribution system.

17. The distribution system according to claim 15, the viewer terminal displays a screen for confirming whether or not the photographed image is distributed before the photographic image distribution system distributes the photographed image.

18. A distribution method, comprising:
generating at least one clock signal and at least one counter circuit in order to count a time on the basis of the number of pulses of the clock signal by a time measurement unit;
acquiring a photographing condition set by the distributor from the distributor terminal;
transmitting a photographing instruction signal, which allows a photographing operation to be automatically executed in a case where a viewer satisfies the photographing condition, to a viewer terminal; and
acquiring a photographed image obtained by the photographing operation from the viewer terminal, the photographing operation comprising receiving, on a photographing execution unit, the photographing instruction signal, said photographing execution unit configured to associate the photographing instruction signal with a predetermined clock time and determine a predetermined time measurement value between an initiation time of live content to be provided on the viewer terminal and the predetermined clock time, and executing, on the photographing execution unit, the photographing operation at the predetermined time based on the time provided by the time measurement unit reaching the predetermined time measurement value, wherein
the photographing condition is a subject condition, and
the photographing instruction signal transmission unit allows a pose including a body expression, which the viewer is requested to take, to be displayed on a photographing screen of the viewer terminal as the subject condition, and allows the viewer terminal to execute the photographing operation in a case where the viewer terminal recognizes that the viewer takes the pose, wherein the viewer terminal is configured to recognize that the viewer has taken the pose based on a detection, by the viewer terminal, of body expression aspects comprising at least one of an arm orientation or a hand configuration.

19. A non-transitory computer readable storage medium storing a program, executable by a computer, comprising:
a time measurement unit that generates at least one clock signal and at least one counter circuit in order to count a time on the basis of the number of pulses of the clock signal;
a photographing condition acquisition unit that acquires a photographing condition set by the distributor from the distributor terminal;
a photographing instruction signal transmission unit that transmits a photographing instruction signal, which allows a photographing operation to be automatically executed in a case where a viewer satisfies the photographing condition, to a viewer terminal;
a photographing execution unit that receives the photographing instruction signal, said photographing execution unit configured to associate the photographing instruction signal with a predetermined clock time and determine a predetermined time measurement value between an initiation time of live content to be provided on the viewer terminal and the predetermined clock time, and executes the photographing operation at the predetermined time based on the time provided by the time measurement unit reaching the predetermined time measurement value; and
a photographed image acquisition unit that acquires a photographed image obtained by the photographing operation from the viewer terminal, wherein
the photographing condition is a subject condition, and
the photographing instruction signal transmission unit allows a pose including a body expression, which the viewer is requested to take, to be displayed on a photographing screen of the viewer terminal as the subject condition, and allows the viewer terminal to execute the photographing operation in a case where the viewer terminal recognizes that the viewer takes the pose, wherein the viewer terminal is configured to recognize that the viewer has taken the pose based on a detection, by the viewer terminal, of body expression aspects comprising at least one of an arm orientation or a hand configuration.

\* \* \* \* \*